United States Patent [19] [11] 4,092,781
Blake [45] June 6, 1978

[54] CHAIN ELONGATION GAUGE

[76] Inventor: Eugene H. Blake, 874 Hollister St., Space 21-B, San Diego, Calif. 92154

[21] Appl. No.: 783,613

[22] Filed: Apr. 1, 1977

[51] Int. Cl.² .............................................. G01B 5/00
[52] U.S. Cl. .................................. 33/143 J; 33/147 J
[58] Field of Search ................. 33/166, 164 C, 143 J, 33/143 K, 143 M, 143 I, 143 R, 163, 125 R, 147 H, 147 T, 147 R, 147 J, 165, 144, 146

[56] References Cited

U.S. PATENT DOCUMENTS

| 412,631 | 10/1889 | Kraehmer | 33/143 I |
| 686,497 | 11/1901 | Wiedmann | 33/165 |
| 1,111,030 | 9/1914 | O'Brien | 33/166 |
| 1,254,607 | 1/1918 | Kock | 33/166 |
| 3,200,501 | 8/1965 | Keszler | 33/143 J |
| 3,289,307 | 12/1966 | Kelly | 33/143 M |

Primary Examiner—Harry N. Haroian
Attorney, Agent, or Firm—Henri J. A. Charmasson

[57] ABSTRACT

An apparatus for measuring the elongation of chains due to joint wear. The chain under test is tensioned between two arms associated with two nested tubular elements housing a compressed coil spring.

A cylindrical indicator having a helicoidal scale cooperate with the two tubular elements to allow a direct reading of the percentage of elongation of the chain in relation to the length of a reference chain.

9 Claims, 5 Drawing Figures

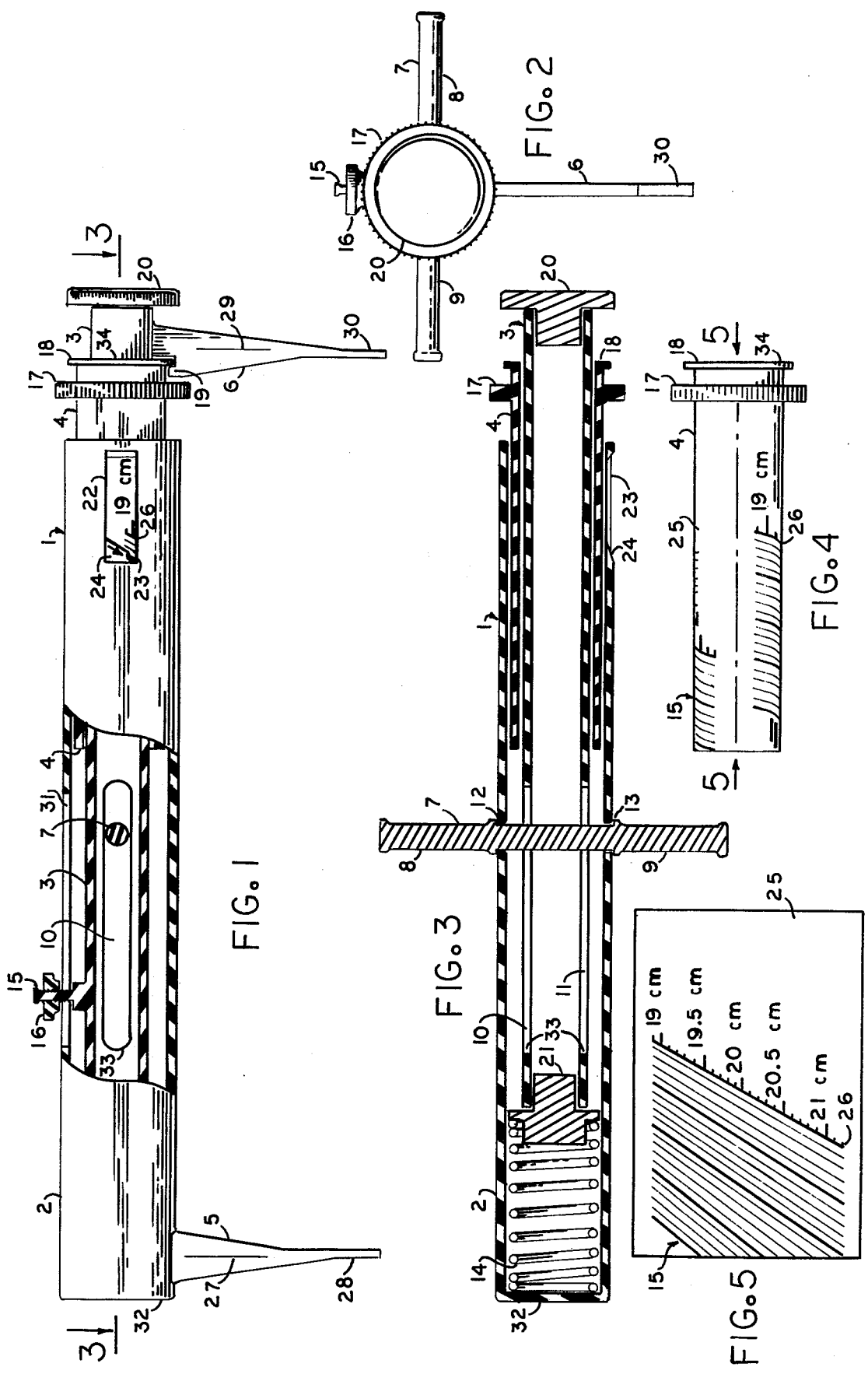

CHAIN ELONGATION GAUGE

BACKGROUND OF THE INVENTION

Roller chains elongation, or chain growth, develops in service when material is worn off the pin and bushing bearing surfaces. Excessive chain growth may cause damage to the driving sprocket teeth. When the sprockets are in a vertical position chain sagging will be produced which in turn can cause the chain to fall away from the teeth of the lower sprocket. Chain manufacturers recommendations limit the useful life of a roller chain to wear elongation of 1.5% to 4% of the chain pitch.

It thus becomes necessary to be able to measure the wear of a chain in order to replace it before it causes a loss of driving power or permanent damage to the drive mechanism.

Wear elongation is commonly measured by laying the chain on a flat surface and measuring the spacing between a certain number of links with a ruler or a slide caliper. A rough assessment of the joint wear of a roller chain can be obtained by measuring its lateral deflection. None of the aforementioned methods provides a true measurement of the chain elongation under tension.

SUMMARY OF THE INVENTION

The present invention provides a portable gauge for measuring the distance between a selected number of links of a chain while the chain is maintained under the tension of a internal spring.

The apparatus features a means for translating the measurement reading into a percentage of elongation in relation to either specified distance previously dialed on a indicator, or to a distance previously measured on a reference chain.

The gauge can be operated with one hand, without removing the chain from its sprockets.

The device can be made small enough to fit in a shirt pocket.

The disclosed embodiment of the invention comprises two nested reciprocating tubular elements housing a compressed coil spring. A pair of measuring arms extending from the reciprocating elements are designed to be inserted between a selected number of links of the chain under test. A rotary indicator inserted between the two reciprocating elements features a helicoidal scale which permits direct reading of elongation of chain, in terms of percentages of chain standard length.

IN THE DRAWING

FIG. 1 illustrates a frontal view of the gauge.

FIG. 2 is a side elevation thereof.

FIG. 3 is a cross-sectional view of the gauge illustrated in FIG. 1 taken along line 3—3.

FIG. 4 is a side view of the cylindrical indicator.

FIG. 5 is a view of the outside surface of the cylindrical indicator shown in FIG. 4, as if it had been cut open along line 5—5 and deployed into a flat surface.

DESCRIPTION OF THE PREFERRED EMBODIMENT OF THE INVENTION

Referring now to the drawing, there is shown a measuring apparatus 1 which comprises a first tubular element 2 formed by an elongated hollow cylinder closed at one end 32. A second tubular element 3 is nested into the open end of the first tubular element 2. The second tubular element 3 is formed by an elongated cylinder having an outside cross-diameter slightly smaller than the inside cross-diameter of the first tubular element 2. The second tubular element 3 can therefore slide back and forth within the first tubular element in a reciprocating motion. A plug 20 closes the exposed end of the second tubular element 3. A cross-pin 7 is inserted through a transversal hole 12–13 in the mid-section of the first tubular element 2 and through a longitudinal slot 10, 11 cut at mid-length into the second tubular element 3. The pin 7 thus limits the longitudinal sliding motion of the second tubular element 3 in relation to the first tubular element 2. The pin 7 also prevents the rotation of one tubular element in relation to the other. A compressed coil spring is housed between the closed end 32 of the first tubular element 2 and a plug 21 closing the nested end of the second tubular element 3. The coil spring 14 forms a resilient means for forcing the two tubular elements 2, 3 toward their maximum combined elongation until pin 7 rests against the end 33 of slot 10, 11.

A short third tubular element 4 is inserted between the first 2 and second 3 tubular elements. A anular thumbwheel 17 near the exposed end 34 of the third tubular element 4 can be used to rotate it around the second tubular element 3. A flange 18 around the exposed end 34 of the third tubular element 4 is captured by a hook shaped bracket 19 associated with the second tubular element 3. The third tubular element 4 is thus prevented from moving longitudinally along the second tubular element 3; but can slidingly and longitudinally move within the first tubular element 2.

Two measuring arms 5 and 6 extend perpandicularly from the first and second tubular elements 2, 3 respectively. The measuring arms 5, 6 are formed by 2 flat tapered prongs terminating in straight, narrow pins whose external edges 28, 30 are aligned with the center lines 27, 29 of the tapered areas.

On the outside surface 25 of the third tubular element 4 a series of helicoidal scale markings 15 are used to measure the longitudinal travel of the second and third elements 3, 4 in relation to the first 2. The third tubular element 4 thus acts as a scaled indicator in measuring the distance spaned by the measuring arms 5, 6.

An elongated window 22 cut into the first tubular element 2 near its open end allows a partial view of the scale markings 15. The window 22 has a slanted edge 24 and a notch 23 cut in the inside corner, which serves as reference point in taking measurements as further explained below.

The helicoidal scale marking 15 on the surface 25 of the indicator 4 comprises a first helicoidal reference line 26. Graduation markings along the reference line 26 correspond to the distance between the measuring arms when the reference line 26 is brought into the notch 23 by rotation of the indicator 4. A family of helicoidal lines appears behind the reference line. The spacing between these lines increase gradually as they progress around the outside surface 25 of the indicator 4. This spacing is an even percentage point of the distance indicated by the graduation marking in the corresponding area of the reference line 26. In this particular embodiment of the invention each line spacing correspond to one percent of the distance engraved along reference line 26.

The apparatus 1 can be used as follows:

If the length of the worn chain is to be compared to the length of a reference chain, two measurements are necessary. The gauge is held one-handedly by wrapping the index and middle finger around the outside projections 8 and 9 of the cross pin 7 and by pressing the thumb against the end plug 20. The gauge is compressed to its minimum length of 19 centimeters or 7.5 inches. The measuring arms 5 and 6 are then inserted across a convenient number of links of the reference chain.

If, for instance, the chain is a standard bicycle chain having a pitch of 0.5 inch or 1.27 centimeters, the gauge will span 15 links. If the measuring arms are pushed down as far as they will go between two links, the center lines 27 and 29, will be located exactly in the middle of the respective links due to the triangular, tapered shape of the arms 5 and 6. When the thumbwheel 17 is rotated to bring the reference line 26 on the surface 25 of indicator 4 in line with the reference point or notch 23 of the window 22, the reading on reference line 26 markings will indicate 19.05 centimeters i.e. 7.5 inches.

If the measuring arms are inserted only as far as the pin areas 28 and 30 the gauge reading will be slightly higher. Without changing the setting of indicator 4 the gauge is then applied to the test chain. It is imperative that the gauge span the same number of links in both measurements and that the measuring arms be inserted, each time, in the same fashion.

If the test chain has suffered elongation through wear the gauge will extend slightly farther in the second measurement. The percentage of elongation can be read by counting the number of lines appearing between the reference line 26 and the reference point 23. For instance the reading shown in FIG. 1 would correspond to an elongation of 3%.

If the original pitch of the chain under test is known, the indicator can directly be set to a convenient setting before applying the gauge to the chain. For instance, a setting of 19.05 centimeters or 7.5 inches, would accomodate 20 links of a chain having a ⅜ inch, pitch, or 0.9525 centimeters, 30 links of a chain having a ¼ inch or 0.635 centimeter pitch.

A locking mechanism is provided to lock the gauge into a measured condition if necessary in order to facilitate the reading or setting of the indicator 4. The locking mechanism comprises a threaded stem 15 extending perpendicularly from the second tubular 3 element through a longitudinal slot 31 in the top surface of the first tubular element 2. A locking nut 16 externally engages the threaded stem 15 and when tightened locks the two tubular elements 2 and 3 together.

A similar device could be built to measure percentage of contraction rather than percentage of elongation. The spring would have to be located between the cross pin 7 and the plug 21 in order to force the gauge to its minimum elongation. The reference line would then have to be located on the opposite side of the indicator surface 25.

While I have shown and described the preferred form of my invention and have suggested modifications, therein, other changes and modifications may be made, within the scope of the appended claims, without departing from the spirit and scope of this invention.

What is claimed is:

1. A measuring apparatus which comprises: a first tubular element;
   a second tubular element slidingly nested into the first tubular element;
   resilient means for forcing the tubular elements toward their maximum combined elongation;
   means for limiting the longitudinal motion and for preventing the rotation of the second tubular element in relation to the first;
   cylindrical indicator means for measuring the longitudinal travel of the second tubular element in relation to the first comprising:
     a third element slidingly inserted between the first and second tubular elements;
     means for preventing the longitudinal motion of the third element in relation to the second tubular element; and helicoidal scale markings over the outside surface of the third tubular element cooperating with a reference point on the first tubular element, and a reference point on the first tubular element.

2. The apparatus claimed in 1 wherein said first and second tubular elements each comprises:
   a measuring arm extending substantially perpendicular therefrom; and means for locking the two tubular elements together.

3. The apparatus claimed in 2 wherein said cylindrical indicator means comprises:
   a first helicoidal reference line;
   means for aligning said reference line with the reference point on the first tubular element; and
   a series of helicoidal lines whose spacings increase gradually as they progress around the third cylindrical element.

4. The apparatus claimed in 3 wherein said spacing corresponds to an even percentage of the distance between the measuring arms when the reference line is aligned with said reference point.

5. The apparatus claimed in 4 wherein said arm comprises a flat tapered prong terminating into a straight narrow pin.

6. The apparatus claimed in 5 wherein said first tubular element comprises:
   an elongated hollow cylinder closed at one end having a transversal hole across its mid section;
   said second tubular element comprises:
   an elongated cylinder having a outside cross-diameter slightly smaller than the inside cross-diameter of the first tubular element and a longitudinal slot at midlength;
   said means for limiting and for preventing comprises a cross pin inserted through said slot and said hole.

7. The apparatus claimed in 6 wherein said means for locking comprises:
   a threaded stem fastened to the second tubular element extending perpendicularly therefrom through a longitudinal slot in the surface of the first tubular element
   and a locking nut externally engaging the threaded stem;
   said resilient means comprises a coil spring compressed between the closed end of the first tubular element and the second tubular element.

8. The apparatus claimed in 3 wherein said means for aligning comprises an annular thumbwheel associated with the third tubular element.

9. The apparatus claimed in 8 wherein said cross-pin extends externally on each side of the first tubular element;
   said means for preventing the longitudinal motion of the third tubular element comprises a flange around the exposed end of the third tubular element; and
   a bracket associated with the second tubular element capturing the flange;
   said first tubular element having an elongated window cut near its open end, said window having a notch in one of its inside corners forming said reference point.

* * * * *